(12) United States Patent
Ditzman et al.

(10) Patent No.: US 9,021,261 B2
(45) Date of Patent: *Apr. 28, 2015

(54) INTEGRATED SECURE AND NON-SECURE DISPLAY FOR A HANDHELD COMMUNICATIONS DEVICE

(75) Inventors: Todd E. Ditzman, Vincentown, NJ (US); Michael J. Paparo, Lafayette Hill, PA (US)

(73) Assignee: L-3 Communications Corporation, New York, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/562,397

(22) Filed: Jul. 31, 2012

(65) Prior Publication Data

US 2013/0191925 A1    Jul. 25, 2013

Related U.S. Application Data

(63) Continuation of application No. 11/679,553, filed on Feb. 27, 2007, now Pat. No. 8,261,064.

(51) Int. Cl.
*H04L 29/06* (2006.01)
*G06F 21/60* (2013.01)
*G06F 21/74* (2013.01)
(Continued)

(52) U.S. Cl.
CPC ................. *G06F 21/60* (2013.01); *G06F 21/74* (2013.01); *G06F 21/70* (2013.01); *G06F 21/83* (2013.01); *G06F 21/84* (2013.01); *G06F 2221/2105* (2013.01)

(58) Field of Classification Search
CPC .............. G06F 21/82–21/85; G06F 21/70; G06F 21/74
USPC ............................................. 713/194; 726/34
See application file for complete search history.

(56) References Cited

U.S. PATENT DOCUMENTS 5,970,146 A    10/1999    McCall et al.
6,567,092 B1    5/2003    Bowen
(Continued)

FOREIGN PATENT DOCUMENTS

EP    1355218 A2    10/2003
EP    1526426 A2    4/2005

OTHER PUBLICATIONS

"Microsoft Computer Dictionary 5th Edition", Microsoft Corporation, May 1, 2002, 112 and 520.

*Primary Examiner* — Ashok Patel
*Assistant Examiner* — Daniel Potratz
(74) *Attorney, Agent, or Firm* — Condo Roccia Koptiw LLP

(57) ABSTRACT

A handheld communications device is created with a touch sensitive display, a secure computing component, and a non-secure computing component. The secure component may comprise a secure CPU executing a secure operating system. The non-secure component may comprise a separate non-secure CPU executing a separate non-secure operating system. The touch sensitive display on the handheld communications device is divided into a secure portion and a non-secure portion such that information displayed in the secure portion is provided by the secure operating system, and information displayed in the non-secure portion is provided by the non-secure operating system. Similarly, data entered through the secure portion of the display is provided to the secure operating system, and data entered through the non-secure portion of the display is provided to the non-secure operating system.

20 Claims, 5 Drawing Sheets

(51) Int. Cl.
*G06F 21/83* (2013.01)
*G06F 21/84* (2013.01)
*G06F 1/26* (2006.01)
*G06F 11/00* (2006.01)
*G08B 13/00* (2006.01)
*G08B 21/00* (2006.01)
*G08B 29/00* (2006.01)
*G06F 11/30* (2006.01)
*G06F 12/14* (2006.01)
*G06F 21/70* (2013.01)

(56) References Cited

U.S. PATENT DOCUMENTS

| | | | |
|---|---|---|---|
| 6,630,928 | B1 | 10/2003 | McIntyre et al. |
| 6,715,078 | B1 * | 3/2004 | Chasko et al. ................ 713/193 |
| 7,007,025 | B1 * | 2/2006 | Nason et al. ............................ 1/1 |
| 7,024,565 | B1 * | 4/2006 | Beiley et al. .................. 713/194 |
| 7,043,639 | B2 * | 5/2006 | Mukogawa ................... 713/182 |
| 7,706,777 | B2 * | 4/2010 | Karaoguz et al. ............. 455/411 |
| 2004/0024710 | A1 | 2/2004 | Fernando et al. |
| 2004/0212547 | A1 | 10/2004 | Adamski et al. |
| 2007/0223689 | A1 * | 9/2007 | O'Brien et al. ................. 380/30 |

* cited by examiner

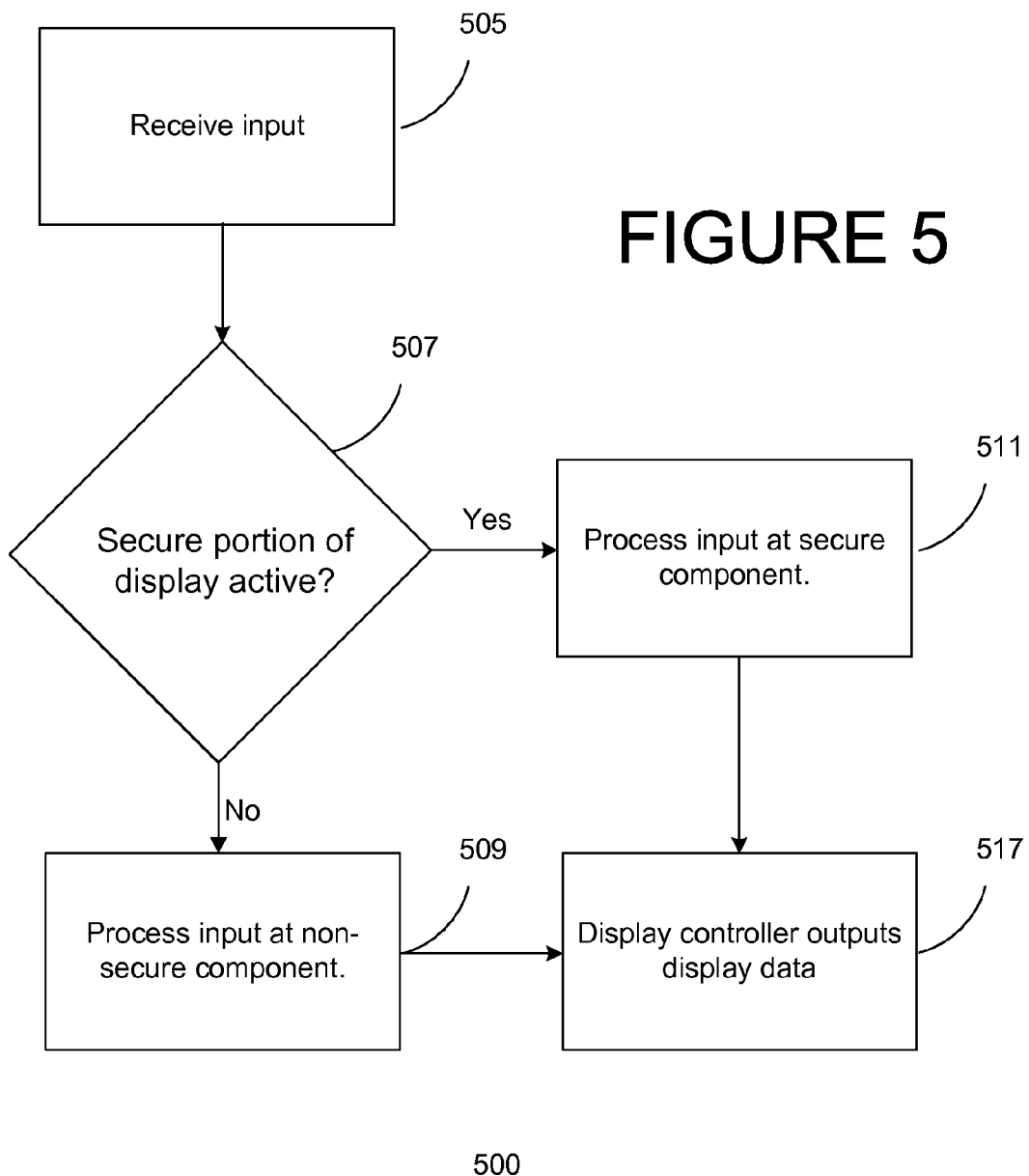

INTEGRATED SECURE AND NON-SECURE DISPLAY FOR A HANDHELD COMMUNICATIONS DEVICE

CROSS REFERENCE TO RELATED APPLICATIONS

This application is a continuation of U.S. patent application Ser. No. 11/679,553, filed Feb. 27, 2007, the contents of which are hereby incorporated by reference herein.

FIELD OF THE INVENTION

This invention is related to the field of secure computing; more specifically this invention is related to the field of secure computing on handheld communications devices.

BACKGROUND OF THE INVENTION

Data security is an important goal for a wide variety of industries. For corporations, this data may contain sensitive customer information. For the government, this data may contain military secrets. Typical methods for protecting this data include secure systems. An example of a secure system is a computer that has been put through some type of certification process or inspection that provides a reasonable assurance that any data entered into, or received from this particular computer is protected from access by unauthorized users, and can be considered secure.

Because of additional costs and overhead associated with using a secure system, users often split their work between secure and non-secure systems. For example, a user may use the secure computer when sending intra-company emails, but may prefer to use the non-secure computer to send personal emails or use the internet because the secure system may use a specialized operating system that may not support all of the applications available for the non-secure system. Further, an employer may wish to ensure the integrity of the secure system by limiting the use of the secure system to highly sensitive data only.

While keeping separate secure and non-secure computer systems is acceptable for desktop computers in office environments where space and weight are not concerns, it is generally unacceptable for handheld or mobile computer users. A user of a handheld computer may be unwilling to carry separate secure and non-secure handheld computers.

Therefore what is needed is a way to combine a secure and non-secure system on a single handheld communications device.

SUMMARY OF THE INVENTION

A handheld communications device is created with a secure computing component and a non-secure computing component. The secure component may comprise a secure CPU executing a secure operating system. The non-secure component may comprise a separate non-secure CPU executing a separate non-secure operating system. The secure and non-secure components share a common input and output system within the handheld communications device, such as a keyboard and display, for example.

A touch sensitive display on the handheld communications device is divided into a secure portion and a non-secure portion such that information displayed in the secure portion is provided by the secure operating system, and information displayed in the non-secure portion is provided by the non-secure operating system. Similarly, data entered through the secure portion of the display is provided to the secure operating system, and data entered through the non-secure portion of the display is provided to the non-secure operating system.

When an input is received via the touch sensitive display it is routed to a component in the secure component of the handheld communications device. Based on coordinates associated with the input, the component determines if the input was made in the secure or non-secure portion of the display. If the component determines the input was made in the secure portion of the display, then the input is routed to the secure operating system. If the component determines that the input was made in the non-secure portion of the display, then the input is routed into the non-secure operating system. By determining if inputs are directed to the non-secure or secure portion of the display in the secure component of the handheld communications device, the integrity of the data is preserved because no inputted data is provided to the non-secure component of the device until it is determined in the secure component of the device which portion of the display received the data.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 5 is an illustration of an exemplary method 500 for receiving and processing inputs made to a keyboard in a handheld communications device with integrated secure and non-secure components in accordance with the present invention.

DETAILED DESCRIPTION OF ILLUSTRATIVE EMBODIMENTS

Figure 1:
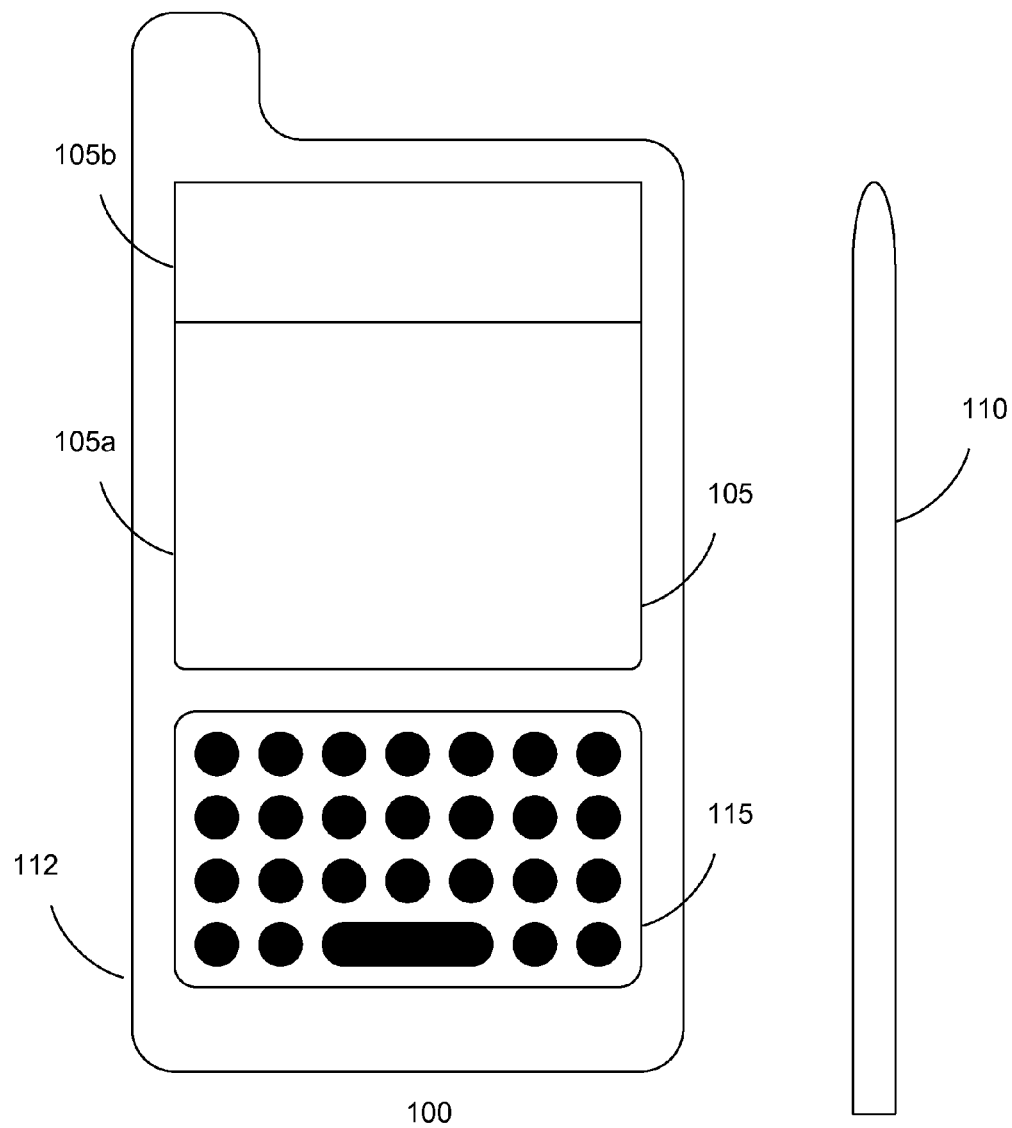
FIG. 1 is an illustration of an exemplary handheld communications device 100 with an integrated secure and non-secure display in accordance with the present invention.

FIG. 1 is an illustration of an exemplary handheld communications device 100 with an integrated secure and non-secure display in accordance with the present invention. The handheld communications device includes a housing 112, a keyboard 115, and a display 105. The display 105 may include a touch sensitive overlay, allowing the handheld communications device 100 to receive input made directly on the display though a stylus 110, for example. The display 105 can comprise any one of many commercially available displays, such as the SHARP® LQ030B7DD01, for example.

The handheld communications device 100 includes separate secure and non-secure processing components (not shown) within the housing 112. The processing of secure and non-secure data is separated between the secure and non-secure components to allow a user to view and input both secure and non-secure data on a single device. The hardware of the handheld communications device 100 is configured such that all processing of secure display data is handled only by the secure processing component. Similarly, the hardware is configured such that all processing of non-secure display data is handled only by the non-secure processing component. Further, the determination of whether a particular piece of data is secure or non-secure is first made in the secure processing component. The secure and non-secure hardware components are described further with respect to FIG. 2.

The display 105 is similarly bifurcated into two sections, a non-secure section 105a and a secure section 105b. The non-secure section 105a displays and receives (through the touch sensitive overlay) data and inputs for the non-secure processing component. Similarly, the secure section 105b displays and receives data and inputs for the secure processing component. In one embodiment, the secure section 105b comprises the top 38 rows of pixels. However, the actual location and size of both the secure section 105b and the non-secure section 105a is an arbitrary design choice.

The housing 112 is configured to preserve the integrity of at least the secure processing component and the display 105. This configuration may include making the housing 112 extremely difficult to disassemble once assembled, or deactivating the processing components once tampering has been detected. The housing 112 may be implemented using any number of known techniques for handheld device construction and security.

Figure 2:
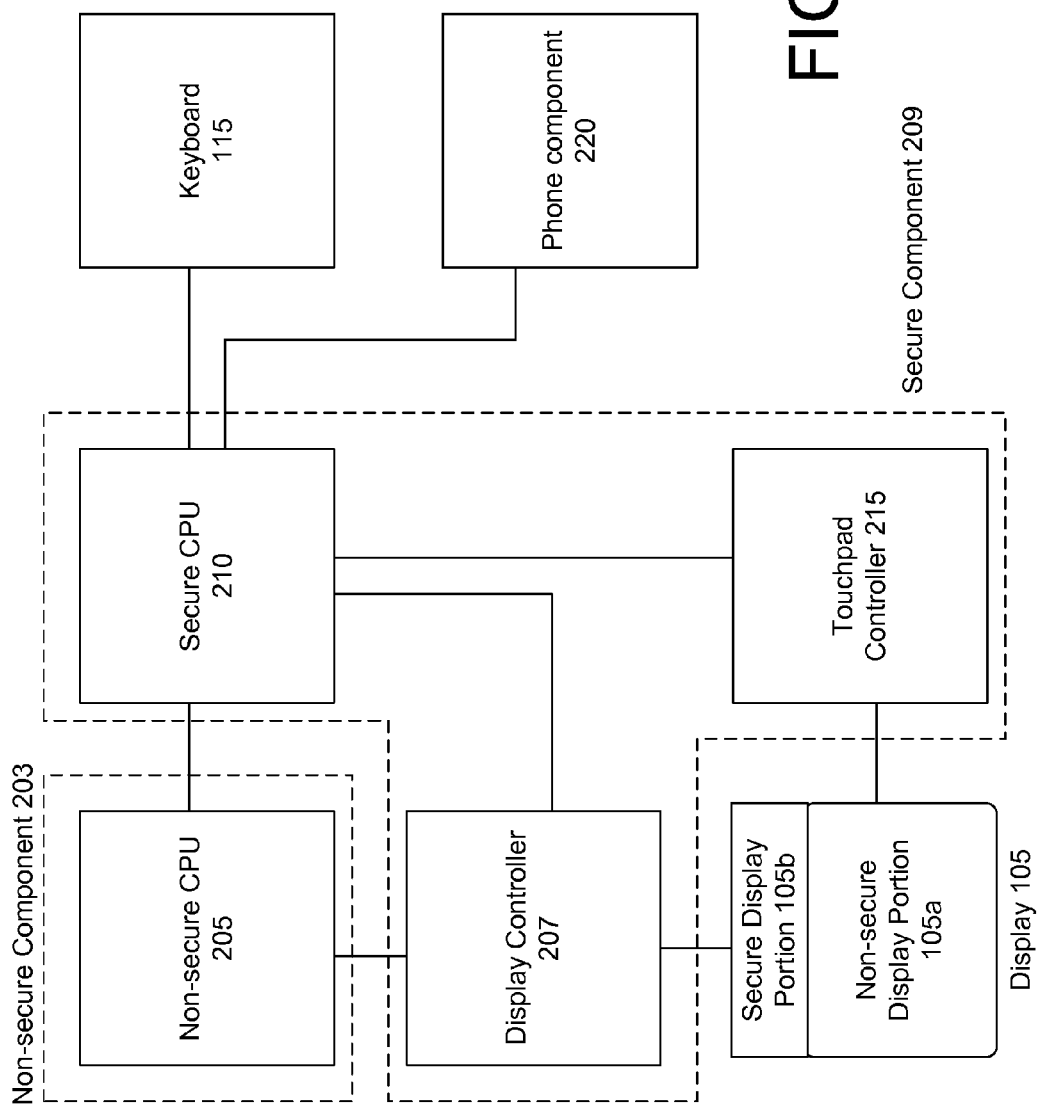
FIG. 2 is an illustration of an exemplary system 200 capable of the processing and display of both secure and non-secure data.

FIG. 2 is an illustration of an exemplary handheld communication system 200 capable of displaying and processing secure and non-secure data in accordance with the present invention. As shown, the system includes a secure component 209 and a non-secure component 203. The system further includes a display controller 207 that drives a display 105, a keyboard 115 for receiving character input from a user, and a phone component 220 for sending and receiving data.

The secure component 209 comprises a secure CPU 210, a touchpad controller 215, and a display controller 207. The secure CPU 210 executes a secure operating system. The secure operating system is an operating system that has met some set of standards or certification process that deems it to be secure. For example, a secure operating system may have shown to be impervious to certain known techniques employed by hackers. The particular standards that the secure operating system is judged by may be different depending on the particular field that the handheld device will be utilized. For example, what standards judge a secure operating system for a law firm may be different than what standards are used for the Government. Any standard for secure computing known in the art may be used.

The touchpad controller 215 receives input made to the display 105. As described above, the display 105 comprises two portions, a secure display portion 105b and a non-secure display portion 105a. When the touchpad controller 215 receives a user input from the touch screen which is mounted on display 105, it forwards the input which consists of the set of coordinates that identifies where on the display the input was received, to the secure CPU 210. The secure CPU 210 receives the input from the touchpad controller 215 and uses associated coordinates to determine which portion of the display 105 the input was received.

The secure CPU 210 determines which portion of the display 105 the input was received in by comparing the received coordinates with stored coordinates describing the boundaries of at least one of the secure display portion 105b and non-secure display portion 105a. The stored coordinates are stored in memory within the secure component 209. By storing the coordinates in the secure component 209, the authenticity of those coordinates can be maintained.

If the secure CPU 210 determines that the input was received in the non-secure display portion 105a, any data associated with the input is forwarded into the non-secure component 203 for processing. The non-secure component 203 comprises the non-secure CPU 205. If the secure CPU 210 determines that input was received in the secure portion of the display, then the data is kept in the secure component 209 for processing by the display controller 207.

The non-secure CPU 205 may comprise one or more CPUs. In one embodiment the non-secure CPU 205 comprises an Intel PXA270 Processor. However, any commercially available CPU may be used.

The non-secure CPU 205 may execute one or more non-secure operating systems. In one embodiment the non-secure operating system comprises Windows CE®; however any suitable operating system known in the art may be used.

The non-secure CPU 205 and the secure CPU 210 route their respective display data to the display controller 207. The display controller 207 takes the received data and directs it to the correct inputs of the display 105, such that the data received from the secure CPU 210 is displayed in the secure display portion 105b and the data received from the non-secure CPU 205 is displayed in the non-secure display portion 205a. In addition, the display controller 207 may optionally alter or transform the display data from the secure CPU 210 by adjusting the color depth. A technique for adjusting the color depth is described further with respect to FIG. 4, for example.

Figure 3:
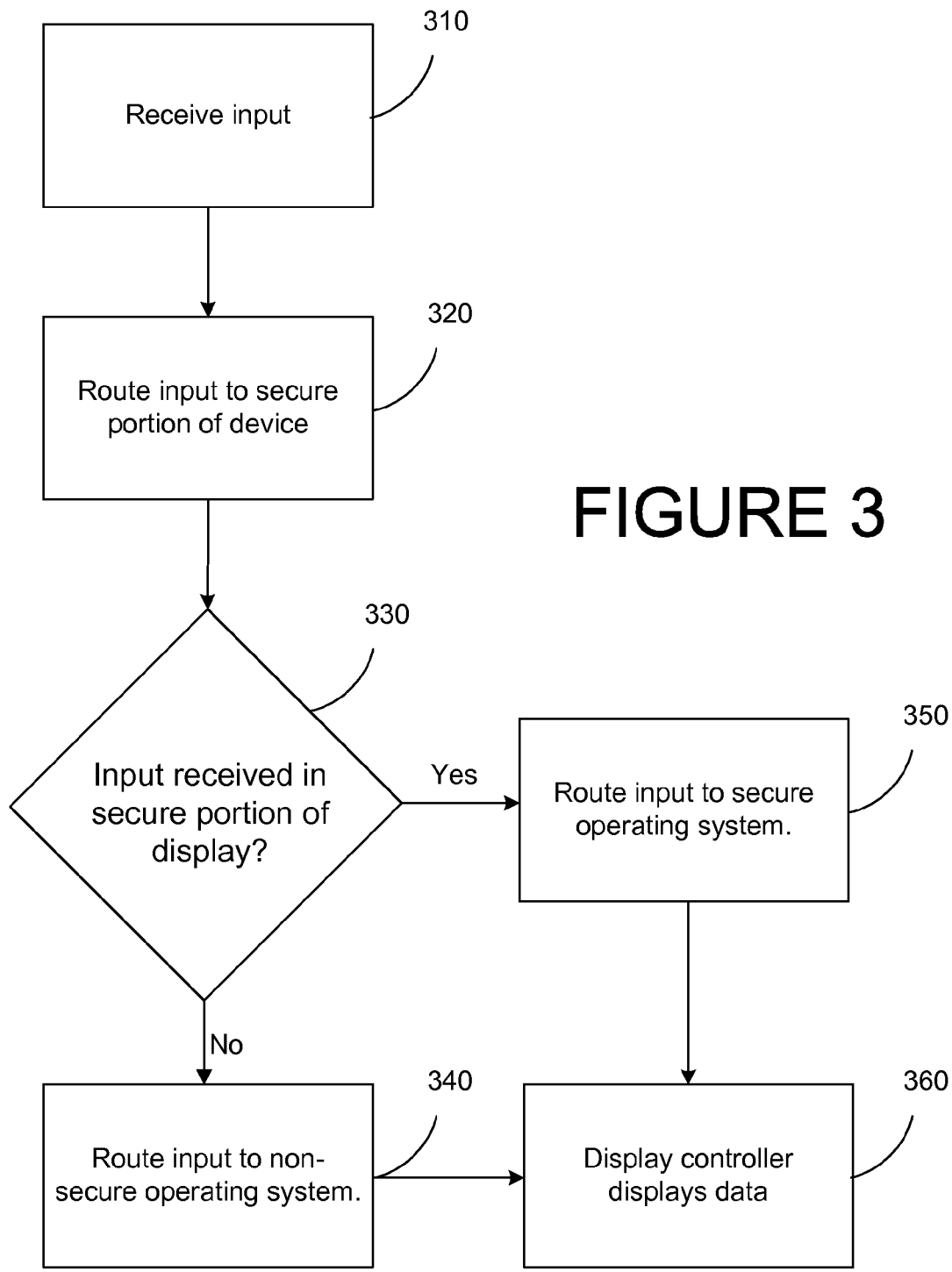
FIG. 3 is an illustration of an exemplary method 300 for receiving and processing inputs made to a display on a handheld communications device with integrated secure and non-secure components in accordance with the present invention.

FIG. 3 is an illustration of an exemplary method for receiving and processing inputs made to a display with integrated secure and non-secure components in accordance with the present invention. At 310, an input is received by the handheld communications device. The input may be received through a touch sensitive overlay on top of the display, for example.

At 320, received input is routed to a secure component of the handheld device. As illustrated in FIG. 2, the handheld communications device includes both a secure and non-secure component, with each component having its own CPU and operating system. In addition, each of the secure and non-secure components has a corresponding section of the display through which data is received and displayed by the corresponding component. In this way, a single handheld communications device is able to function as both a secure and non-secure device.

At 330, the secure component makes a determination if the input was made to the secure portion of the display. In order to ensure that no secure data is received by the non-secure component, determinations as to which component a received input is directed to is made within the secure component. The secure component may make the determination by comparing coordinates associated with the received input with stored coordinates of the secure display. If the received input is within the secure display, then the embodiment continues at 350. Else, the embodiment continues at 340.

At 340, the input is routed to the non-secure component of the handheld device. The input is received and processed by a non-secure operating system executing on the non-secure CPU. The non-secure operating system may comprise Windows CE®; however, any operating system capable of executing on a handheld communications device may be used.

At 350, the input is acted on by the secure component. As described above, a determination has been made that the data was directed to the secure component. Accordingly, the data is directed to a secure operating system executing on a secure CPU. Both the secure CPU and secure operating system are deemed to be secure by meeting some standard for security. The particular standards required of the operating system and CPU to meet may vary depending on the sensitivity of the data or the anticipated use for the handheld device.

At 360, output from the secure or non-secure CPUs is routed to the display controller. The display controller drives the attached display of the handheld communications device. As described above, the display is bifurcated into a secure portion and a non-secure portion, with each display portion corresponding to the secure or non-secure component respectively. The display controller combines the received display output and sends it to the display for viewing.

Figure 4:
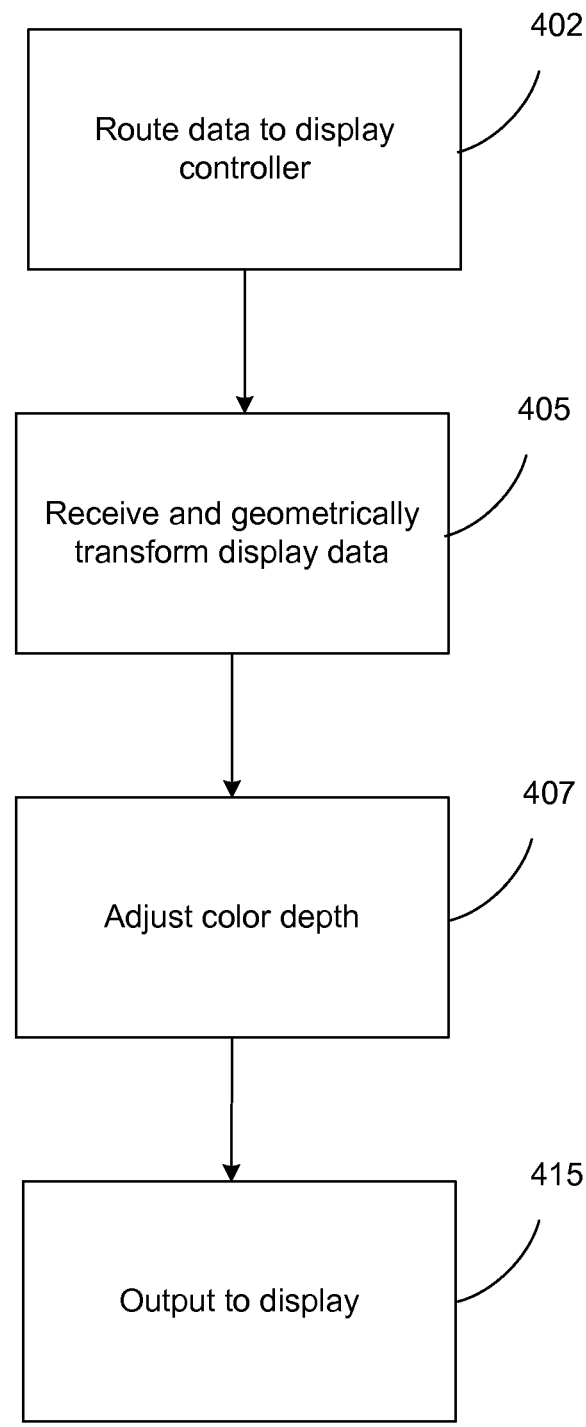
FIG. 4 is an illustration of an exemplary method 400 for the display of secure and non-secure data on a single display in accordance with the present invention.

FIG. 4 is a method for integrating data received from a secure component, and a non-secure component on a single display in accordance with the present invention. At 402, display data is routed from both the secure and non-secure components to a display controller. The display controller is adapted to receive the display data from the secure and non-secure components and display the data in their associated portion of the attached display.

At 405, the display data is received and refreshed to the display by the display controller. Each of the secure and non-secure components output display data unaware that they are sharing space on a single display. In one embodiment, the pixel data for the secure and non-secure display portions are retrieved from the respective secure and non-secure component memory by the display controller and used to refresh the appropriate portion of the display.

At 407, the color depth of the received display data may be adjusted in accordance with the particular requirements of the attached display. Because of the type of applications that are typically executed by the secure operating system, it may be desirable to use a lower color depth for the secure operating system than the depth used for the non-secure operating system to save system resources. However, the display utilized by the handheld communications device may not be able to display received data with non-uniform color depth.

In order to allow the secure operating system to operate at a lower color depth, the received lower color depth display data is first converted to the same color depth as the non-secure operating system before being output to the LCD display by the display controller.

In one embodiment the operating system of the secure component outputs display data at a color depth of 8-bit, while the non-secure operating system outputs data with a color depth of 16-bit. To increase the color depth of the secure component output, a lookup table is used by the display controller. The table comprises an entry for each 8-bit color along with a 16-bit equivalent. The 8-bit colors of the secure component output are then replaced with the 16-bit equivalents from the table, saving memory resources in the secure component 209.

At 415, the modified secure and non-secure output data are displayed on the display of the handheld communications device. Any system for interfacing the display controller with the display can be used.

FIG. 5 is an illustration of a method 500 for processing input made to the Keyboard in accordance with the present invention. At 505, an input is received through the Keyboard 115. The input may have been directed to either the secure component 209 or the non-secure component 203.

At 507, the input is routed to the secure component 209 to determine which portion of the display 105 was active when the keyboard 115 input was received. The secure component 209 may determine which portion of the display was active by determining which portion of the display last received a user input. If the secure component 209 determines that the active portion of the display is the non-secure display portion 105a, then the keyboard input is routed from the secure component 209 to the non-secure component 203 at 509. If the secure component 209 determines that the active portion of the display is the secure display portion 105b, then the input is processed by the secure component 209 at 511.

At 509, the keyboard input is routed to the non-secure component of the handheld device. The input is received and processed by a non-secure operating system executing on the non-secure CPU.

At 511, the keyboard input is processed by the secure component 209. As described above, a determination has been made that the data was directed to the secure component 209. Accordingly, the data is directed to the secure operating system executing on the secure CPU.

At 517, any output from the secure or non-secure CPUs is routed to the display controller 207.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The various techniques described herein can be implemented in connection with hardware or software or, where appropriate, with a combination of both. Thus, the methods and apparatuses can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for seamlessly compressing and transferring information.

What is claimed:

1. A method for identifying inputs to a handheld communications device, the method comprising:

receiving an input to the handheld communications device via a touch screen display;

determining whether coordinates of the input correspond to coordinates of a first portion of the touch screen display or to coordinates of a second, concurrently present portion of the touch screen display at a first component, wherein the determination as to whether the coordinates of the input correspond to the coordinates of the first portion of the touch screen display or to the coordinates of the second portion of the touch screen display dictates which of a plurality of operating system process the input;

processing the input at the first component on condition that it is determined that the coordinates of the input correspond to the coordinates of the first portion of the touch screen display, wherein the first component comprises a first operating system of the plurality of operating systems configured to provide information to be displayed on the first portion of the touch screen display and to process inputs received via the first portion of the touch screen display;

processing the input at a second component on condition that it is determined that the coordinates of the input correspond to the coordinates of the second portion of the touch screen display, wherein the second component comprises a second operating system of the plurality of operating systems configured to provide information to be displayed the second portion of the touch screen display and to process inputs received via the second portion of the touch screen display; and routing information provided from the first operating system and information provided from the second operating system to a display controller, wherein the display controller displays the information routed from the first operating system on the first portion of the touch screen display and displays the information routed from the second operating system on the second portion of the touch screen display.

2. The method of claim 1, wherein the first portion of the touch screen display is a secure portion of the touch screen display, the second portion of the touch screen display is a non-secure portion of the touch screen display, the first component comprises a secure component, the second component comprises a non-secure component, and determining whether the coordinates of the input correspond to the coordinates of the first portion of the touch screen display or to the coordinates of the second portion of the touch screen display is performed at the first component.

3. The method of claim 2, further comprising sending the input from the first component to the second component on condition that it is determined that the coordinates of the input correspond to the coordinates of the second portion of the touch screen display.

4. The method of claim 3, wherein the secure component comprises a secure CPU executing the first operating system and the non-secure component comprises a non-secure CPU executing the second operating system.

5. The method of claim 1, wherein determining whether the coordinates of the input correspond to the coordinates of a first portion of the touch screen display or to the coordinates of a second portion of the touch screen display comprises comparing the coordinates of the input to one or more of stored coordinates of the first portion of the touch screen display or stored coordinates of the second portion of the touch screen display.

6. The method of claim 1, further comprising:
the display controller determining the coordinates of the input; and
the display controller sending the coordinates of the input to the secure component for determining whether the input is directed to the first portion of the touch screen display or the second portion of the touch screen display.

7. The method of claim 1, further comprising providing a visual indication that differentiates the first portion of the touch screen display and the second portion of the touch screen display.

8. The method of claim 1, wherein the handheld communications device further comprises a non-touch screen input component and the method further comprises:
receiving a second input via the non-touch input component;
processing the second input at the first component on condition that the first portion of the touch screen display had been active when the second input was received; and
processing the second input at the second component on condition that the second portion of the touch screen display had been active when the second input was received.

9. A mobile communications device comprising:
a shared input and output interface comprising a touch screen display, the touch screen display comprising a first portion and a concurrently present second portion;
a first component comprising a first operating system of a plurality of operating systems that is configured to:
determine whether coordinates of a input received via the touch screen display correspond to coordinates of a first portion of the touch screen display or to coordinates of a second portion of the touch screen display, wherein the determination as to whether the coordinates of the input correspond to the coordinates of the first portion of the touch screen display or to the coordinates of the second portion of the touch screen display dictates which of the plurality of operating systems process the input,
provide information to be displayed on the first portion of the touch screen display and process inputs received via the first portion of the touch screen display, and
process the input on condition that it is determined that the coordinate of the input correspond to the coordinates of the first portion of the touch screen display;
a second component comprising a second operating system of the plurality of operating systems that is configured to:
provide information to be display on the second portion of the touch screen display and process inputs received via the second portion of the touch screen display, and
process the input on condition that it is determined that the coordinates of the input correspond to the coordinates of the second portion of the touch screen display; and
a display controller configured to:
receive information routed from the first operating system and information routed from the second operating system,
display the information routed from the first operating system on the first portion of the touch screen display, and
display the information routed from the second operating system on the second portion of the touch screen display.

10. The mobile communications device of claim 9, wherein the shared input and output interface further comprises a keyboard and the first component is further configured to determine whether the first portion of the touch screen display or the second portion of the touch screen display was active when a second input was received via the keyboard.

11. The mobile communications device of claim 9, wherein the first component is further configured to:
process a second input on condition that it is determined that the first portion of the touch screen display was active when the second input was received; and
send the second input to the second component on condition that is determined that the second portion of the touch screen display was active when the second input was received.

12. The mobile communications device of claim 9, wherein the first component is further configured to:
store one or more of coordinates corresponding to the first portion of the touch screen display or coordinates corresponding to the second portion of the touch screen display; and
compare the coordinates of the input to one or more of the coordinates corresponding to the first portion of the touch screen display or the coordinates corresponding to the second portion of the touch screen display.

13. The mobile communications device of claim 9, further comprising a phone component that is configured to send and received mobile data.

14. The mobile communications device of claim 9, wherein the first operating system comprises a secure operating system and the second operating system comprises a non-secure operating system.

15. The mobile communications device of claim 9, wherein the second component is further configured to access the Internet.

16. A method for processing inputs to a mobile device, the method comprising:

determining whether coordinates of a input received via a touch screen display correspond to coordinates of a first portion of the touch screen display or to coordinates of a second, concurrently present portion of the touch screen display at a first component, wherein the determination as to whether the coordinates of the input correspond to the coordinates of the first portion of the touch screen display or to the coordinates of the second portion of the touch screen display dictates which of a plurality of operating systems process the input;

processing the input at the first component on condition that it is determined that the coordinates of the input correspond to the coordinates of the first portion of the touch screen display, wherein data displayed on the first portion of the touch screen display is provided by a first operating system of the plurality of operating systems of the first component and inputs received via the first portion of the touch screen display are processed by the first operating system of the first component; and sending the input to a second component on condition that it is determined that the coordinates of the input correspond to the coordinates of the second portion of the touch screen display, wherein data displayed on the second portion of the touch screen display is provided by a second operating system of the plurality of operating systems of the second component and inputs received via the second portion of the touch screen display are processed by the second operating system of the second component; and routing information provided from the first operating system and information provided from the second operating system to a display controller, wherein the display controller displays the information routed from the first operating system on the first portion of the touch screen display and displays the information routed from the second operating system on the second portion of the touch screen display.

17. The method of claim 16, further comprising processing the input at the second component on condition that the input is sent to the second component.

18. The method of claim 16, further comprising disabling one or more of the first component or the second component based on detecting tampering of the mobile device.

19. The method of claim 16, further comprising a display controller determining the coordinates of the input, and the display controller sending the coordinates of the input to the first component for determining whether the input is directed to the first portion of the touch screen display or the second portion of the touch screen display.

20. The method of claim 19, further comprising visually indicating that the first portion of the touch screen display is displaying secure data.

\* \* \* \* \*